United States Patent [19]

Olsher et al.

[11] Patent Number: 5,578,830
[45] Date of Patent: Nov. 26, 1996

[54] NEUTRON DOSE EQUIVALENT METER

[75] Inventors: Richard H. Olsher; Hsiao-Hua Hsu; William H. Casson; Dennis G. Vasilik, all of Los Alamos, N.M.; Jeffrey H. Kleck, Menlo Park; Anthony Beverding, Foster City, both of Calif.

[73] Assignee: The Regents of the University of California, Oakland, Calif.

[21] Appl. No.: 456,271

[22] Filed: May 31, 1995

[51] Int. Cl.$^6$ ................................................. G01T 3/00
[52] U.S. Cl. ........................... 250/390.03; 250/392
[58] Field of Search ...................... 250/390.01, 390.03, 250/392

[56] References Cited

U.S. PATENT DOCUMENTS 4,074,136  2/1978  Heinzelmann et al. ............... 250/392

5,278,417  1/1994  Sun ................................... 250/390.03

Primary Examiner—Carolyn E. Fields
Assistant Examiner—Edward J. Glick

[57] ABSTRACT

A neutron dose equivalent detector for measuring neutron dose capable of accurately responding to neutron energies according to published fluence to dose curves. The neutron dose equivalent meter has an inner sphere of polyethylene, with a middle shell overlying the inner sphere, the middle shell comprising RTV® silicone (organosiloxane) loaded with boron. An outer shell overlies the middle shell and comprises polyethylene loaded with tungsten. The neutron dose equivalent meter defines a channel through the outer shell, the middle shell, and the inner sphere for accepting a neutron counter tube. The outer shell is loaded with tungsten to provide neutron generation, increasing the neutron dose equivalent meter's response sensitivity above 8 MeV.

9 Claims, 2 Drawing Sheets

NEUTRON DOSE EQUIVALENT METER

FIELD OF THE INVENTION

The present invention generally relates to the detection of radiation and more specifically to the detection of neutron radiation and the determination of the dose equivalency of such radiation. This invention was made with Government support under Contract No. W-7405-ENG-36 awarded by the U.S. Department of Energy. The Government has certain rights in the invention.

BACKGROUND OF THE INVENTION

Neutron dose equivalent detectors, historically referred to as rem meters, which measure the absorbed dose of radiation in living tissue, are widely used in nuclear facilities throughout the world. Although they may take numerous different forms, they are each intended to closely match the response function of the meter to the fluence-to-dose conversion function promulgated by international and national standards bodies and regulatory agencies. Such a detection system can be used in a radiation field even when the neutron spectrum in not well known. However, prior rem meters have not accurately matched the fluence-to dose conversion function over the entire energy spectrum.

Rem meters are typically calibrated at a single effective neutron energy. The detector's response at other energies depends on how accurately its response tracks the conversion function with the incident neutron energy.

Commercially available instruments, such as SNOOPY®, manufactured by Nuclear Research Corporation, and the Eberline NRD® have a very poor response to high-energy neutrons. Because the SNOOPY® rem meter uses a cylindrical moderator, its directional response is unbalanced. The shape of its response function is not identical for both side and frontal exposures. Within the last few years, improvements in rem meter response have been made by adding one centimeter of lead (Pb) to the moderator to increase high-energy neutron sensitivity. However, even this design did not result in a rem meter that closely matches accepted fluence-to-dose curves.

All current commercial rem meters have no useful response at energies higher than 20 MeV. This means that the current generation of rem meters is seriously handicapped in accelerator environments where neutrons may be produced having energies in the GeV range.

Recently, several attempts have been made to enhance and extend the high-energy response of the conventional rem meter. A paper authored by Birattari et al. Entitled "An Extended Range Neutron Rem Counter," published in *Nuclear Instruments and Methods in Physics Research*, Vol. A297, pp. 250–257, 1990, was the first to discuss the use of lead as a means of enhancing rem meter sensitivity at high neutron energies. The paper dealt with modifying the standard SNOOPY® rem meter with the addition of 1 to 2 cm layers of lead.

In a later paper by Birattari et al., "Calibration of the Neutron Rem Counter LINUS in the Energy Range from Thermal to 19 MeV," *Nuclear Instruments and Methods in Physics Research*, Vol. A324, pp. 232–238, 1993, LINUS, a neutron rem meter of the SNOOPY® type having an internal 1 cm layer of lead was described. Measurements were presented to show a 55% increase in response at 19 MeV relative to an unmodified SNOOPY® rem meter. Unfortunately, accuracy of the modified rem meter for thermal neutron energies was still poor, and the added lead layer reduced response accuracy at intermediate neutron energies. In addition, the LINUS meter does nothing to correct the intrinsic directional response problems of the standard SNOOPY® design.

Another rem meter design is disclosed in U.S Pat. No. 5,278,417, issued Jan. 11, 1994, to Sun. Disclosed in this patent is a high-energy dose equivalent meter in a spherical configuration. It has an internal layer of lead for increasing response sensitivity above the (n,xn) reaction threshold of 8 MeV. By virtue of its spherical symmetry, the rem meter disclosed in this patent does not suffer from the directional response problems of the previous designs. However, response accuracy for thermal through intermediate neutron energies remains poor. Additionally, the design is poor with respect to manufacturability, due to the presence of the spherically shaped lead layer.

It is therefore an object of the present invention to provide a neutron dose equivalent detector which has a response to neutron fluence which accurately reflects the fluence to dose conversion factors over a wide energy range.

It is another object of the present invention to provide a neutron dose equivalent detector having a uniform directional response.

It is still another object of the present invention to provide a rem meter comprised of non-toxic materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a neutron dose equivalent detector for making neutron dose measurements comprising an inner sphere of polyethylene, a middle shell overlying the inner sphere, the middle shell comprising RTV® silicone (organosiloxane) loaded with boron. An outer shell overlies the middle shell, the outer shell comprising polyethylene loaded with tungsten. The rem meter defines a channel through the outer shell, the middle shell, and the inner sphere for accepting a neutron counter tube.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for the detection of the full range of neutron dose equivalents, from low energy to high energy. The invention accomplishes this through a novel application of tungsten to the moderators of the detector and the positioning of the moderators. The invention will be most easily understood through the drawings and the following discussion.

Figure 1:
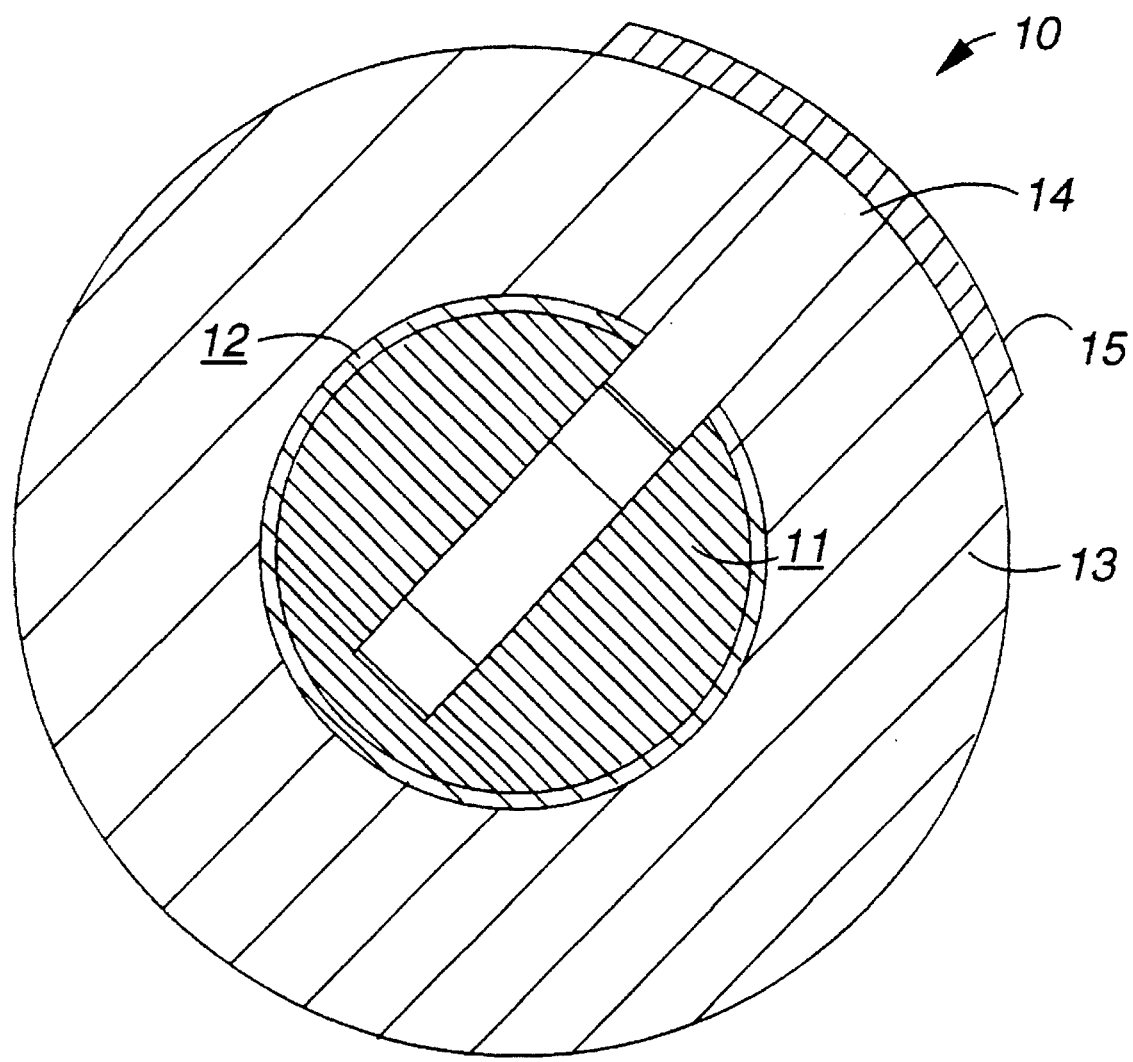
FIG. 1 is a cross-sectional view of the present invention in which the various spheres of the invention, and their positioning, are illustrated.

In FIG. 1, there can be seen a cross-sectional view of the spherical detector 10 according to the invention in which inner sphere 11 is encompassed by middle shell 12. Outer shell 13 encircles middle shell 12. Channel 14 allows a neutron counter tube (not shown) to be placed inside inner sphere 11. Channel 14 is sealed with patch 15.

In order for detector 10 to provide dose measurements which track standard neutron fluence to dose equivalent conversion functions, the elements of detector 10 have been carefully designed and positioned. First, outer shell 13 performs as a moderator and a fast neutron generator, and comprises polyethylene loaded with tungsten powder to a level of 30% W by weight. It is primarily the loading of outer shell 13 with tungsten that gives the present invention its ability to accurately yield fluence to dose equivalent measurements over the entire pertinent energy range. This fast neutron generation is accomplished due to the fact that fast neutrons with energies above 8 MeV may knock 1 or more lower energy neutrons from the tungsten atoms.

Middle shell 12 is a thin layer of RTV® silicone (organosiloxane) with 5% boron by weight, and cooperates with outer shell 13 to further contour the response of detector 10 to the fluence to dose equivalent curve. It accomplishes this by reducing the response to thermal and intermediate energy neutrons.

Inner sphere 11 is comprised of polyethylene and further moderates any fast neutrons through elastic collisions. The moderation of the fast neutrons is necessary to the invention so that proper detection of high energy neutrons can be accomplished by a neutron counting tube. In order to achieve improved response to certain energies, inner sphere may be loaded with beryllium.

Patch 15, which seals channel 14, is comprised of RTV® silicone (organosilaxane), which is loaded to 15% boron by weight. Its function is to prevent neutrons from streaming into channel 14 and into the neutron counting tube without having traversed through outer shell 13, middle shell 12, and inner sphere 11.

The tungsten used in the present invention can be in the form of tungsten carbide (WC) powder, or in the form of finely granulated tungsten metal. Its purpose is to act as a neutron generator material to increase the response sensitivity of the detector 10 for the energy region above 8 MeV. While tungsten and the lead used in the prior art have similar (n,xn) cross sections, the tungsten of the present invention is superior because it is non toxic, because it can be loaded uniformly within the volume of outer shell 13, and because tungsten's absorption resonance structure in the energy region of 0.1 to 1 keV is ideal for shaping the detector response function at intermediate neutron energies. Tungsten is also preferred because of the poor physical characteristics of lead which result in manufacturing difficulties.

Factors which affect a neutron dose equivalent detector's response function include the size and shape of the moderator, the amount and location of the neutron absorbers in the moderator, and the amount and location of neutron generating materials. Because of the complex interaction among these factors, Monte Carlo transport techniques were employed as a part of the design process.

The design of the present invention has achieved the closest fit in the neutron dose equivalent detector art between the response of detector 10 and the fluence to dose conversion function, especially for the region from 50 to 250 keV which is critical for nuclear power plant dosimetry. Additionally, the spherical geometry of detector 10 provides for uniform directional response. Finally, detector 10 has a useful response sensitivity to energies as high as 3 GeV.

The present invention is optimized for the U.S. Department of Energy and U.S. Nuclear Regulatory Commission mandated fluence to dose equivalent conversion function. This function was first recommended by the National Council on Radiation Protection and Measurements in Report No. 38 (NCRP 38). For this embodiment, detector 10 has a total radius of approximately 12.3 cm. Inside, outer shell 13 has a thickness of approximately 6.48 cm; middle shell 12 has a thickness of approximately 3.2 mm; and inner sphere 11 has a thickness of approximately 5.5 cm.

However, the present invention can be readily modified to meet fluence to dose conversion functions based on the International Commission on Radiation Protection Report 60 (ICRP 60), which is utilized internationally. This modification involves only reducing the thickness of outer shell 13 from 6.48 cm for NCRP 38 to 5.8 cm for IRCP 60.

To further improve the response of detector 10 to neutrons with energies of 2 MeV and higher, inner sphere 11 can be loaded with $^9$Be to make use of its unique property of a low threshold of (n,2n) reactions. This embodiment of the invention represents an optimization for high-energy applications, and is described in a paper by Hsu et al., entitled "A New High-Energy Neutron Dose Equivalent Meter Designed by Monte Carlo Simulations," which is expected to published in *Radiation Protection Dosimetry* in the Fall of 1995. This paper is included herein for all purposes.

Channel 14 is sized to accommodate a commercial counter tube, such as a $BF_3$ counter tube. In one embodiment, channel 14 has a diameter of 1 inch to accept a N. Wood Model G-10-2A® counter tube which has an active volume of 1 inch by 2 inches. This counter tube performs very well with detector 10.

Figure 2:
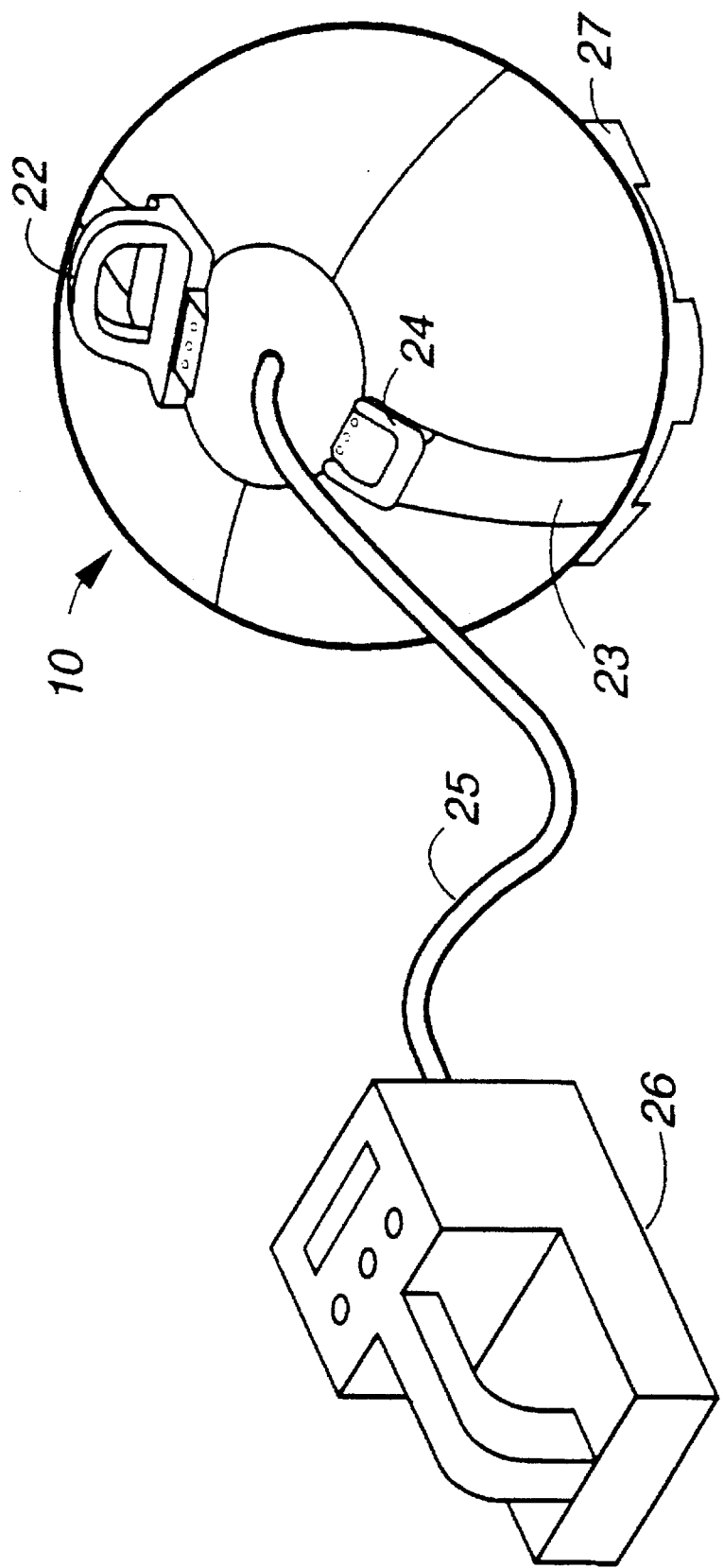
FIG. 2 is a perspective view of the detector of the present invention placed on a pedestal, and the cable connection to electronic sensing means.

FIG. 2 illustrates one possible operational arrangement for detector 10. Here detector 10 is shown with handle 22 and surrounding belt 23 providing clasps 24 for holding patch 15 in place over channel 14 (not shown), and for securing together the two hemispheres of detector 10. Running through patch 15 is cable 25 which connects the neutron counter tube inside channel 14 to electronic sensing means 26. Detector 10 can rest on platform 27 as shown, or simply be placed on a surface.

To prevent neutron streaming, which has been a problem with earlier spherical detectors, the two hemispheres of detector 10 are mated together in a tongue and groove relationship. That is, one hemisphere defines a rectangular groove near its periphery and the other hemisphere defines a mating rectangular tongue near its periphery. This tongue and groove arrangement effectively seals the connection of the two hemispheres so that neutron streaming is prevented.

The foregoing description of the preferred embodiments of the invention have been presented for purposes of illustration and description. It is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A neutron dose equivalent detector for measuring neutron dose equivalents comprising:

an inner sphere of polyethylene;

a middle shell overlying said inner sphere, the middle shell comprising organosiloxane loaded with boron;

an outer shell overlying said middle shell, said outer shell comprising polyethylene loaded with tungsten;

wherein said neutron dose equivalent detector defines a channel through said outer shell, said middle shell, and said inner sphere for accepting a neutron counter tube;

a neutron counter tube located in said channel; and wherein said neutron dose equivalent detector defines two hemispheres mated together in a tongue and groove arrangement.

2. The neutron dose equivalent meter as described in claim 1, wherein said inner sphere is loaded with $^9$Be.

3. The neutron dose equivalent meter as described in claim 1, wherein said middle shell is loaded with 5% boron by weight.

4. The neutron dose equivalent meter as described in claim 1, wherein said outer shell is loaded with 30% tungsten by weight.

5. The neutron dose equivalent meter as described in claim 1, further comprising a conductive cable connecting said neutron counter tube to electronic sensing means.

6. The neutron dose equivalent meter as described in claim 1, wherein said inner sphere has a diameter of approximately 5.5 cm.

7. The neutron dose equivalent meter as described in claim 1, wherein said middle shell has a thickness of approximately 3.2 min.

8. The neutron dose equivalent meter as described in claim 1, wherein said outer shell has a thickness of approximately 6.48 cm.

9. The neutron dose equivalent meter as described in claim 1, wherein said outer shell has a thickness of approximately 5.8 cm.

* * * * *

UNITED STATES PATENT AND TRADEMARK OFFICE
CERTIFICATE OF CORRECTION

PATENT NO. : 5,578,830
DATED : November 26, 1996
INVENTOR(S) : Richard H. Olsher et al.

It is certified that error appears in the above-identified patent and that said Letters Patent is hereby corrected as shown below:

On the title page item [73],

Assignee:     The Regents of the University of California, Oakland, Calif.; and Varian Associates, Inc., Palo Alto, Calif.

Signed and Sealed this

Tenth Day of November 1998

Attest:

BRUCE LEHMAN

*Attesting Officer*      *Commissioner of Patents and Trademarks*